(12) United States Patent
Fukayo

(10) Patent No.: US 11,794,534 B2
(45) Date of Patent: Oct. 24, 2023

(54) TOWING ATTACHMENT INSTALLABLE ON WORK MACHINE

(71) Applicant: AGRIPROJECT LIMITED COMPANY, Hokkaido (JP)

(72) Inventor: Mitsuharu Fukayo, Hokkaido (JP)

(73) Assignee: AGRIPROJECT LIMITED COMPANY, Hokkaido (JP)

( * ) Notice: Subject to any disclaimer, the term of this patent is extended or adjusted under 35 U.S.C. 154(b) by 580 days.

(21) Appl. No.: 17/043,860

(22) PCT Filed: Dec. 4, 2018

(86) PCT No.: PCT/JP2018/044560
§ 371 (c)(1),
(2) Date: Sep. 30, 2020

(87) PCT Pub. No.: WO2019/215948
PCT Pub. Date: Nov. 14, 2019

(65) Prior Publication Data
US 2021/0138855 A1 May 13, 2021

(30) Foreign Application Priority Data

May 11, 2018 (JP) .................................. 2018-092253

(51) Int. Cl.
*B60D 1/18* (2006.01)
*B66D 1/08* (2006.01)
(Continued)

(52) U.S. Cl.
CPC ............. *B60D 1/185* (2013.01); *B60D 1/187* (2013.01); *B66D 1/08* (2013.01); *B66D 1/28* (2013.01); *E02F 3/96* (2013.01)

(58) Field of Classification Search
CPC .......... B60D 1/18; B60D 1/185; B60D 1/187; B60D 1/52; B66D 1/08; B66D 3/006; B66D 3/06; E02F 3/96
See application file for complete search history.

(56) References Cited

U.S. PATENT DOCUMENTS 2,194,623 A * 3/1940 Thompson ............. B60D 1/185
280/505
7,828,270 B2 * 11/2010 Duvall ...................... B60P 3/12
254/323
(Continued)

FOREIGN PATENT DOCUMENTS

JP 2537406 Y2 6/1997
JP 1997175128 A 7/1997
(Continued)

OTHER PUBLICATIONS

International Search Report—PCT/JP2018/044560—dated Mar. 12, 2019.

*Primary Examiner* — Minnah L Seoh
*Assistant Examiner* — Hosam Shabara
(74) *Attorney, Agent, or Firm* — Calderon, Safran & Cole P.C.

(57) ABSTRACT

Provided is a tow attachment that can be installed on a work machine as an attachment for towing a tow object. This tow attachment installable as a work machine attachment for towing a tow object is provided with: a body frame; a winch fixed on the body frame; a coupling part which is provided to the body frame so as to be mounted on the work machine; a movable pulley part which is equipped with a hook for coupling to the tow object and at least one movable pulley; and a wire fixing part which is provided to the body frame in order to fix a leading end of a wire that is let out of the
(Continued)

winch, wherein the wire is applied on the movable pulley of the movable pulley part between the winch and the wire fixing part.

15 Claims, 8 Drawing Sheets

(51) Int. Cl.
*B66D 1/28* (2006.01)
*E02F 3/96* (2006.01)

(56) References Cited

U.S. PATENT DOCUMENTS

2008/0089767 A1    4/2008   Duvall
2017/0217267 A1*   8/2017   Vetkos ..................... B66D 1/28

FOREIGN PATENT DOCUMENTS

| JP | 2004331313 A | 11/2004 |
| JP | 2010269698 A | 12/2010 |
| JP | 2013209045 A | 10/2013 |
| JP | 6341627 B1 | 6/2018 |

* cited by examiner

TOWING ATTACHMENT INSTALLABLE ON WORK MACHINE

CROSS-REFERENCE TO RELATED APPLICATIONS AND CLAIM TO PRIORITY

This application is a national stage application of International Application No. PCT/JP2018/044560 filed Dec. 4, 2018, which claims priority to Japanese Patent Application No. 2018-092253 filed May 11, 2018, the disclosures of which are incorporated herein by reference and to which priority is claimed.

FIELD OF THE INVENTION

The present invention relates to a towing attachment attachable to a working machine for towing a vehicle or the like.

BACKGROUND OF THE INVENTION

Generally, when a towing-target vehicle is towed by a towing vehicle, a rear part of the towing vehicle is connected to a front part of the towing-target vehicle with a towing rope such as a wire rope, and towing is performed by driving the towing vehicle to travel forward. In order to stabilize such a towing operation, there have been proposed various techniques for suppressing shock, rocking, vibration, and the like at a connecting unit (Patent Literatures 1 to 3).

Large vehicles such as trucks, trailers, heavy machineries and the like of several tens of tons are used in large farm fields. When such a large vehicle is stuck in a soft ground such as mud in a farm field and is unable to move forward or backward, the vehicle is pulled out using a towing vehicle.

Patent Literatures

Patent Literature 1: Japanese Patent Application Laid-open No. H9-175128
Patent Literature 2: Japanese Patent Application Laid-open No. 2013-209045
Patent Literature 3: Japanese Patent Application Laid-open No. 2010-269698

SUMMARY OF THE INVENTION

Technical Problem

However, in order to pull out a large vehicle by towing as quickly as possible when the large vehicle is stuck in a soft ground and becomes immovable, it is necessary to have a towing vehicle standby at the farm field at all times.

Further, when a large vehicle of several tens of tons is pulled out using a towing vehicle of several tons, the towing vehicle needs to perform towing with substantially the maximum driving force from the start because of the large weight difference between the towing vehicle and the large vehicle. However, if the towing vehicle exerts its maximum driving force from the start, a sudden load is applied to both the vehicle bodies and towing devices, which may cause damage to the vehicle bodies and the towing devices. Furthermore, if a sudden towing force is applied, the large vehicle may be moved forward too much and hit the rear of the towing vehicle. In such a case, not only the vehicle body and the towing devices are damaged, but also a part of the damaged vehicle body and the towing devices may be scattered to the surroundings, which is very dangerous.

In view of the circumstance described above, an object of the present invention is to provide a safe and easy-to-use attachment that is used while being attached to a working machine such as a wheel loader to tow a heavy load such as a large vehicle.

In order to achieve the above object, the present invention provides the following configurations.

An aspect of the present invention provides a towing attachment attachable as an attachment of a working machine in order to perform towing of a towing-target object, the towing attachment comprising:
a body frame;
a winch fixed on the body frame;
a connecting unit provided on the body frame so as to be attached to the working machine;
a movable pulley unit provided with a hook for connecting to a towing-target object and at least one movable pulley; and
a wire fixing unit provided on the body frame so as to fix a leading end of a wire that is pulled out from the winch, wherein
the wire is wound on a movable pulley in the movable pulley unit between the winch and the wire fixing unit.

In the above aspect, it is preferable that the towing attachment further comprises a fixed pulley unit that is configured by combining one or plural fixed pulleys provided on a common shaft and is fixed on the body frame, wherein the movable pulley unit is configured by combining a plurality of movable pulleys provided on a common shaft, and
the wire is stretched in a reciprocated manner between the winch and the wire fixing unit and between each of movable pulleys in the movable pulley unit and each of fixed pulleys in the fixed pulley unit.

In the above aspect, it is preferable that the body frame includes a base having an upper surface to which the winch is fixed, and a wall that rises from the base and has the connecting unit provided thereon.

In the above aspect, it is preferable that the wall has a look-through portion in which a plurality of perforations are formed in order to secure a field of view from a back side of the wall to a front side thereof.

In the above aspect, it is preferable that an angle formed by the base and the wall in side view is perpendicular.

In the above aspect, it is preferable that an angle formed by the base and the wall in side view is an acute angle.

In the above aspect, it is preferable that the towing attachment further comprises a plurality of legs projecting from a lower surface of the base, wherein
the plurality of legs are provided near both a front end and a rear end of the base or provided only near the front end of the base.

In the above aspect, it is preferable that when the plurality of legs are provided near both the front end and the rear end of the base of the base, a leg provided near the front end is longer than a leg provided near the rear end.

In the above aspect, it is preferable that the winch is a hydraulic winch.

The towing attachment attachable to a working machine according to the present invention can be immediately replaced with a work attachment normally attached to the working machine and be attached according to need. Further, as the working machine moves and travels while lifting up the attached towing attachment, the towing attachment can be easily carried to an appropriate towing location.

The towing attachment according to the present invention can tow a large vehicle by using a winch fixed on a body frame. Further, a wire of the winch is wound around a movable pulley between the winch and a leading end of the wire, and a hook provided on the movable pulley is connected to a towing-target object and then towing is performed. Therefore, the pulling force of the winch is amplified by operation of the movable pulley.

Further, as compared to towing by driving and traveling of a conventional towing vehicle, motive power of a winch of hydraulic or electric-powered type or the like can be controlled appropriately, and thus the towing force can be easily controlled. Therefore, a safe towing operation can be achieved.

Further, when the towing attachment according to the present invention is attached to a front side of a working machine, an operator can perform towing while checking its state, and thus the operation becomes safer.

DETAILED DESCRIPTION OF THE PREFERRED EMBODIMENT(S)

Embodiments of the present invention will be described below in detail with reference to the drawings that illustrate examples of the present invention. Among the drawings representing respective examples, like or similar elements are denoted by like or similar reference signs.

Figure 1:
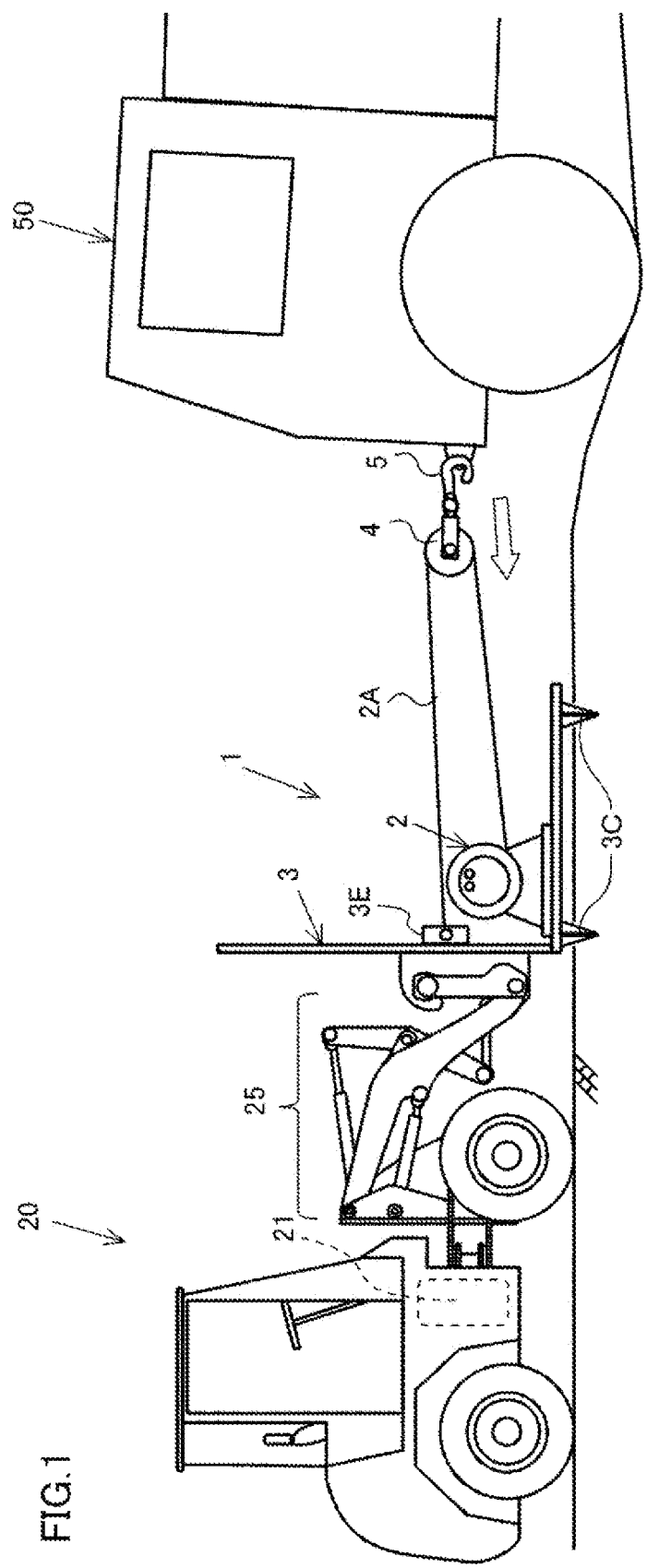
FIG. 1 is a side view schematically illustrating an example of a towing operation using a towing attachment attachable to a working machine according to the present invention.

First, an outline of a towing operation using a towing attachment attachable to a working machine according to the present invention is described with reference to FIG. 1. FIG. 1 is a side view schematically illustrating an example of a towing operation using the towing attachment.

FIG. 1 illustrates a working machine 20 that is a wheel loader. The wheel loader is an example of a working machine that can be combined with a towing attachment 1 according to the present invention. The working machine that can be combined with the towing attachment according to the present invention is not limited to a wheel loader. A wheeled-type working machine is preferred as it can be driven on public roads, but crawler-type working machine can be also combined with the present invention. There are so many types of such working machines used in the civil engineering or construction sector. The working machines that can be combined with the towing attachment according to the present invention are common in that these machines have an attachment support unit 25 on a front side of the body thereof. At a distal end of the attachment support unit 25, a work attachment for performing various tasks is attached.

For example, the attachment support unit 25 of the working machine includes one or plural connecting members referred to as "boom" or "arm", and one or plural hydraulic cylinders referred to as "boom cylinder" or "arm cylinder". The boom and/or arm and the work attachment can be rotated or turned by the hydraulic cylinder being driven to extend or contract by a hydraulic drive mechanism 21 that is provided in a body of the working machine. Examples of a general work attachment include a bucket, a shovel, a fork, a grab, a breaker, and the like. It is also commonly practiced to replace different types of work attachments with one another and use it on a single working machine. In this case, each work attachment needs to have a common connecting structure for detachable attachment to the distal end of the attachment support unit 25.

In FIG. 1, the towing attachment 1 according to the present invention is already attached to the distal end of the attachment support unit 25, instead of a general work attachment. The towing attachment 1 includes a hydraulic winch 2 and a body frame 3 to which the hydraulic winch 2 is fixed. In the following descriptions, regarding a forward and backward direction of the towing attachment, the side facing the working machine in use is referred to as "backward", and the side facing the towing-target object is referred to as "forward".

The hydraulic winch 2 is a preferable example of a winch used in the present invention, and an electric or pneumatic winch can be also used. In other words, motive power of the winch is not limited to hydraulic. A hydraulic winch can be driven and controlled using external output of a hydraulic drive mechanism normally provided on the working machine, and thus it is preferable.

The state illustrated in FIG. 1 is that the towing attachment 1 attached to the working machine 20 is carried by the working machine 20 to a location where the towing operation is performed, and is installed and fixed on the ground. Near this location, there is a towing-target object 50 that is stuck in a soft ground such as mud and is immovable by itself. For example, the towing-target object 50 is a heavy object such as a truck, a trailer, or a heavy machinery of several tens of tons.

A wire 2A wound on a drum of the hydraulic winch 2 is pulled out from the drum and inserted through a trench of a movable pulley provided in a movable pulley unit 4. Further, a leading end of the wire 2A is fixed to a wire fixing unit 3E of the body frame 3. The movable pulley unit 4 has one movable pulley in the illustrated example, and has a hook 5 that is attached via arm-like members extending from both ends of a shaft thereof.

After the hook 5 is connected to the towing-target object 50, the hydraulic winch 2 is driven to wind the wire, thereby enabling to tow and pull out the towing-target object 50 (see the outline arrow). It is preferable that the hydraulic motor provided in the hydraulic winch 2 is driven by sending hydraulic oil from a hydraulic pump of the hydraulic drive mechanism 21 provided in the working machine 20. An operator (not illustrated) on a driver seat of the working machine 20 can perform the towing operation while checking the state ahead. The pulling force of the hydraulic winch 2 is amplified twice as much by interposing one movable pulley, and then applied to the hook 5.

Figure 2:
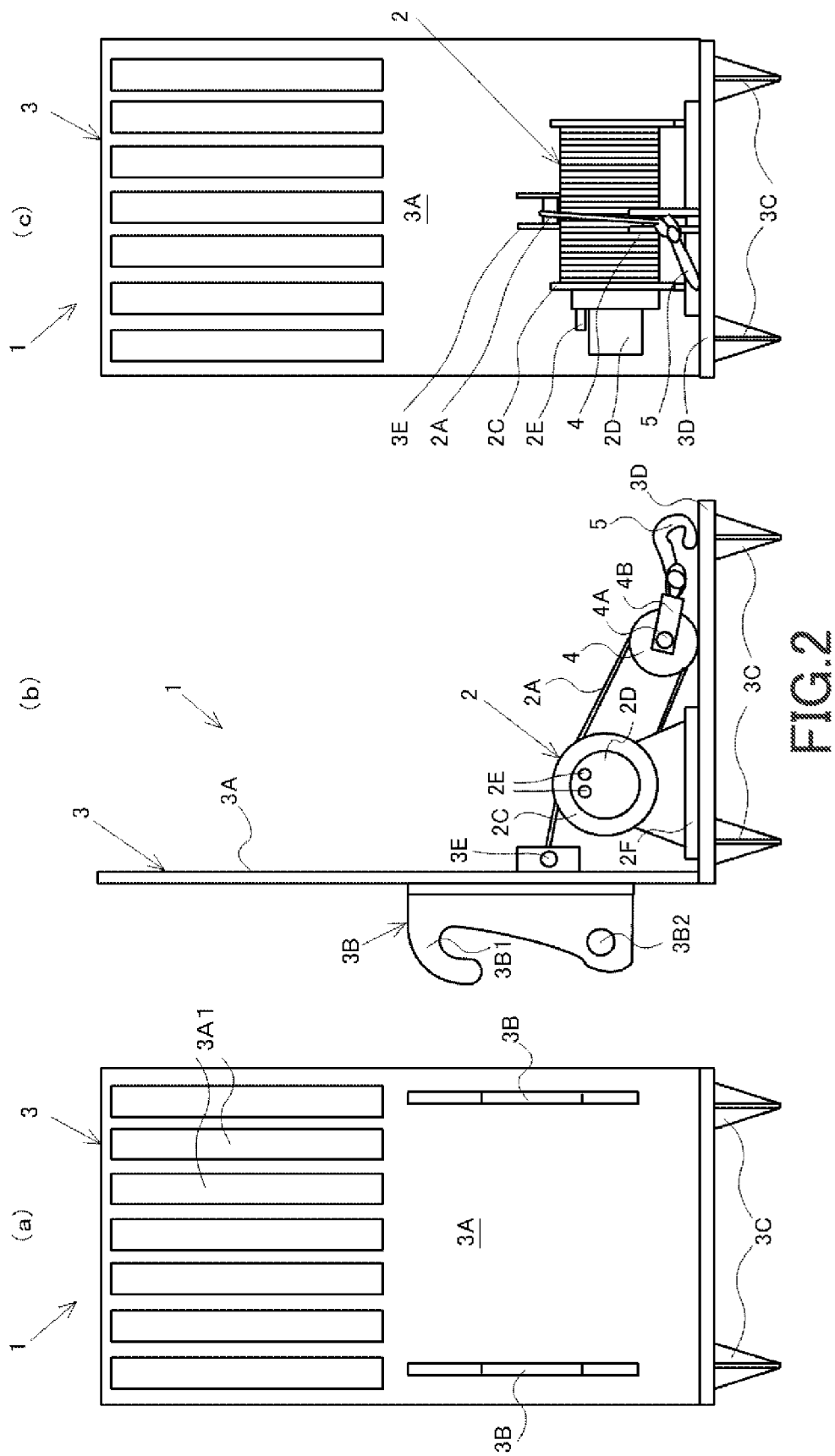
FIG. 2 are enlarged configuration diagrams of the towing attachment illustrated in FIG. 1, where (a) is a rear view, (b) is a side view, and (c) is a front view.
Figure 3:
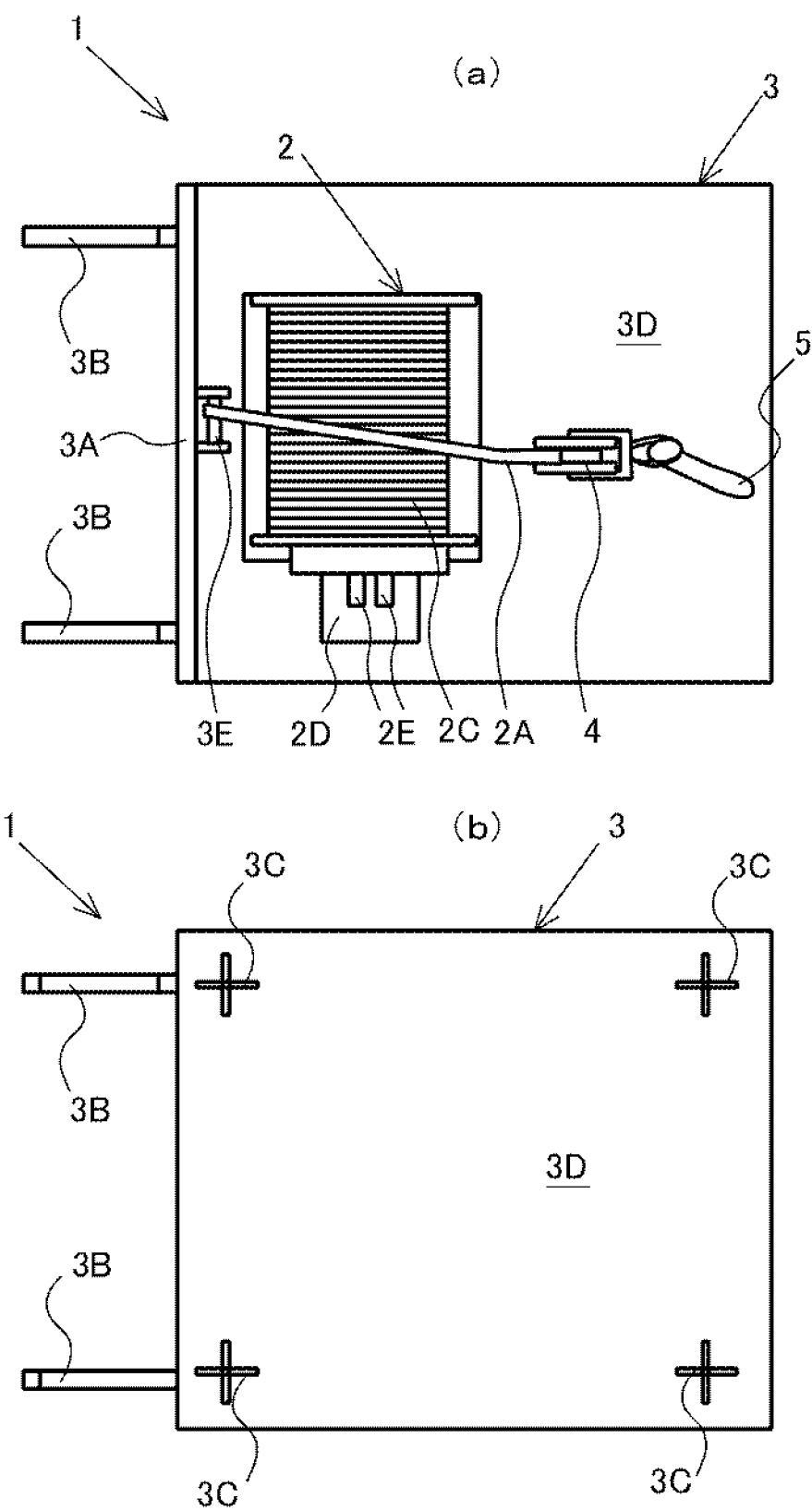
FIG. 3 are enlarged configuration diagrams similar to FIG. 2, where (a) is a plan view and (b) is a bottom view.

FIG. 2 are enlarged schematic configuration diagrams of the towing attachment 1 exemplified in FIG. 1, where (a) is a rear view, (b) is a side view, and (c) is a front view. FIG. 3 are enlarged schematic configuration diagrams similar to FIG. 2, where (a) is a plan view and (b) is a bottom view. With reference to FIG. 2 and FIG. 3, a configuration of the example of the towing attachment 1 illustrated in FIG. 1 is described.

The towing attachment 1 includes the hydraulic winch 2, the body frame 3, the movable pulley unit 4, and the hook 5.

As an example, the hydraulic winch 2 includes the wire 2A, a drum 2C on which the wire 2A is wound, a hydraulic motor 2D, a pair of hydraulic oil ports 2E for supplying and discharging oil, and an attachment frame 2F. By supplying hydraulic oil via the hydraulic oil port 2E, the hydraulic motor 2D can rotate and wind the wire 2A. The hydraulic winch 2 is fixed on an upper surface of the body frame 3. In the illustrated example, with the angle-shaped attachment frame 2F, the hydraulic winch 2 is fixed on the body frame 3 by using fixing means such as welding or bolts and nuts. In order to fix the hydraulic winch 2 to the body frame 3, any fixing means can be used as long as firm fixing can be made. As the hydraulic winch 2, it is possible to select a hydraulic winch from commercially available products and use it according to the required towing force.

The movable pulley unit 4 includes one movable pulley in the illustrated example. The wire 2A pulled out from the drum 2C of the hydraulic winch 2 is inserted through the trench of the movable pulley of the movable pulley unit 4. Further, the leading end of the wire 2A is fixed to the wire fixing unit 3E of the body frame 3. Here, the wire fixing unit 3E is provided on a front surface of a wall 3A of the body frame 3. The wire fixing unit 3E may be provided at any position of the body frame 3 or a member integrated with the body frame 3, as long as the leading end of the wire 2A can be fixed and the towing operation is not hindered.

The movable pulley unit 4 is not fixed. When not in use, for example, the movable pulley unit 4 is placed at an appropriate position of the body frame 3. Arm-like members 4B extend respectively from both ends of a shaft 4A of the movable pulley unit 4. The hook 5 is attached between tips of the pair of arm-like members 4B.

The body frame 3 includes the wall 3A, a connecting unit 3B, legs 3C, and a base 3D. The body frame 3 needs to have certain rigidity and strength and is preferably made of steel. The base 3D is a rectangular flat plate having a predetermined thickness in the illustrated example. The length in a forward and backward direction and the width in a horizontal direction of the base 3D are appropriately set according to the size of the hydraulic winch 2. As another example, the base 3D can be also a frame formed by combining steel angle members and rectangular lumbers or a box formed by combining steel plates.

The wall 3A rises from the base 3D. In the illustrated example, the wall 3A rises from a rear end of the base 3D, and the wall 3A and the base 3D have the same width in the horizontal direction. In the illustrated example, the wall 3A is perpendicular to the base 3D in the side view of FIG. 2(b). One of the functions of the wall 3A is to work as a protective wall to block scattering objects from the front in the event that debris or other objects are scattered due to breakage of a towing-target vehicle, devices, or the like during the towing operation.

Another function of the wall 3A is to connect the working machine 20 illustrated in FIG. 1 to the attachment support unit 25. On the back surface side of the wall 3A, the connecting unit 3B is provided. In the illustrated example, the connecting unit 3B is constituted of a pair of left and right plate-shaped members projecting perpendicularly from the back surface of the wall 3A. A specific shape of the connecting unit 3B is designed to match the connecting portion of the distal end of the attachment support unit 25 to which it is attached.

As an example, the connecting unit 3B includes a hook portion 3B1 facing down and formed on an upper portion thereof, and a hinge pin hole 3B2 formed in a lower portion thereof. For example, the hook portion 3B1 is hooked on a predetermined shaft at the distal end of the attachment support unit 25. For example, the hinge pin hole 3B2 is coaxially aligned with a predetermined hinge pin hole at the distal end of the attachment support unit 25, and is connected and fixed by a predetermined hinge pin. In this manner, by connecting the towing attachment 1 to the attachment support unit 25, the towing attachment 1 is pivotally movable about a shaft that is any of the hook portion 3B1 and the hinge pin hole 3B2.

The width and height of the wall 3A is set as required to function as the protective wall and the connecting unit described above.

Further, preferably, a look-through portion 3A1 is formed in the wall 3A in order to secure a field of view from a back side to a front side thereof. In the illustrated example, the look-through portion 3A1 is located in an upper half of the wall 3A. The look-through portion 3A1 is, for example, formed as a fence-like portion with a plurality of vertically-long slits that are perforated side by side. By providing the look-through portion 3A1, the operator on the driver seat of the working machine can check the state of the towing operation ahead of the wall 3A.

The design of the look-through portion 3A1 can be lattice-like, reticulate, or honeycomb-like, or the like according to the shape of the plurality of perforations, in addition to the fence-like design illustrated in the drawings. As still another example, the look-through portion 3A1 may be formed by cutting out a single window in the upper half of the wall 3A and stretching a wire mesh over the window.

Note that it is preferable that the size of the perforations or a wire mesh forming the look-through portion 3A1 is made smaller than expected scattering objects from the front so that these scattering objects do not pass therethrough.

Further, a plurality of legs 3C projecting downward are provided on a lower surface of the base 3D. In the illustrated example, four legs 3C having the same length are provided, where two of them are provided near the rear end of the base 3D and the other two of them are provided near the front end, and a total of four legs 3C have the same length. The number and positions of the legs 3C are not limited to this example, and are set as required. The legs 3C function as normal support legs when the towing attachment 1 is mounted when it is stored or during standby. On the other hand, when the towing attachment 1 is used for a towing operation, the legs 3C function as fixing parts for securely fixing the towing attachment 1 to the place. In this case, the legs 3C are pushed into the ground so as to dig therein. Therefore, the legs 3C preferably have a tapered shape with a smaller cross section downwardly in order to facilitate digging into the ground like a nail or tooth. Note that a small flat surface is formed at the tip of each leg 3C in consideration of the stability when the legs 3C are installed.

As illustrated in FIG. 2 and the bottom view of FIG. 3(b), as an example, the legs 3C have a shape in which two substantially isosceles triangular plates intersect each other to have a cross-shaped cross section. Another example of the shape of the legs 3C may be conical, pyramid, truncated conical, or truncated pyramid. Alternatively, the shape may be a plate shape with both sides or one side thereof being tapered in thickness toward the tip.

Figure 4:
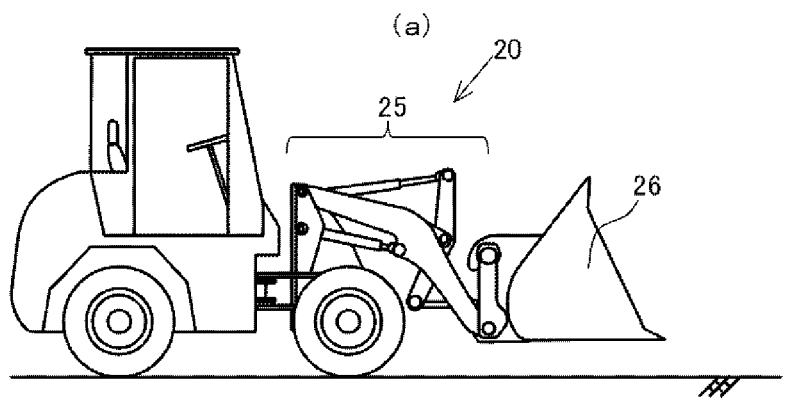
FIGS. 4(*a*), (*b*) and (c) are diagrams illustrating a preparing process prior to performing the towing operation illustrated in FIG. 1.
Figure 4:
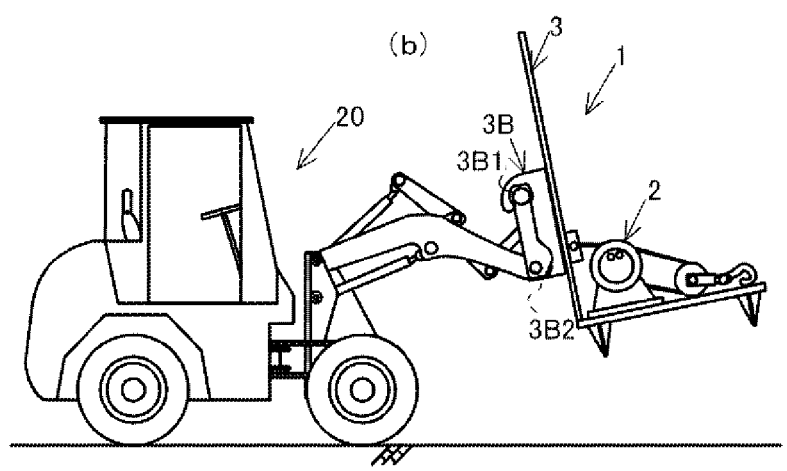
Figure 4:
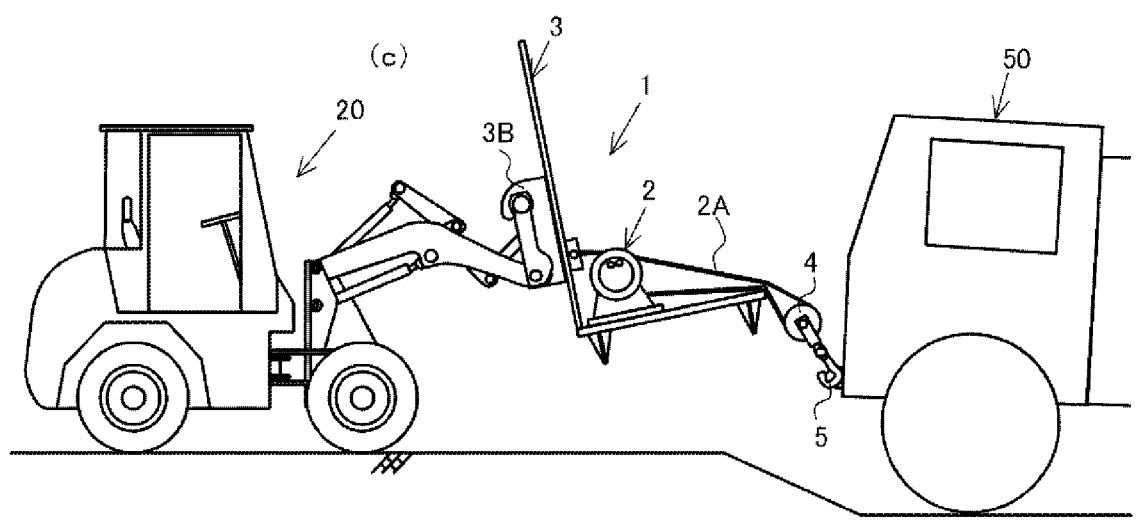

With reference to FIG. 4, an example of the towing operation using the towing attachment illustrated in FIGS. 2 and 3 is described. FIGS. 4(a), (b), (c) are diagrams illustrating a preparing process prior to a towing process illustrated in FIG. 1.

FIG. 4(a) is a state that a bucket 26 that is an attachment for normal operations is attached to the working machine 20 that is a wheeled loader. In various work sites such as a farm field and a civil engineering and construction work site, a predetermined working machine 20 is often assigned for original operations. In this case, the towing attachment 1 according to the present invention having a connecting unit that is attachable to the working machine 20 is brought into the work site, and is installed in a place where the towing attachment 1 will not be an obstacle.

For example, when a large vehicle becomes immovable by itself in a farm field, as illustrated in FIG. 4(b), the bucket 26 of the working machine 20 is removed and replaced with the towing attachment 1 according to the present invention. The hydraulic winch 2 of the towing attachment 1 is then connected to the hydraulic pump of the hydraulic drive mechanism of the working machine 20 using a hydraulic hose (not illustrated).

Subsequently, the working machine 20 travels with the towing attachment 1 being raised and transports the towing attachment 1 to a predetermined location. For example, an appropriate location for actually performing a towing operation is a location where there is an appropriate distance between the towing attachment 1 and the large vehicle 50 that has become immovable and there is a ground that is firm enough to withstand the towing operation.

Preferably, as illustrated in FIG. 4(c), the working machine 20 first travels to a position right in front of the large vehicle 50 before traveling to a location where the towing operation is performed. This process is performed for the operator to connect the hook 5 of the movable pulley unit 4 to the front of the large vehicle 50. The reason thereof is that, because there is a predetermined distance between the place where an actual towing operation is performed and the large vehicle 50, when the movable pulley unit 4 and the hook 5 are heavy, it is difficult for the operator to carry the movable pulley unit 4 and the hook 5 by hand.

Thereafter, while the wire 2A is rolled out from the hydraulic winch 2, the working machine 20 retreats to the location where the towing operation is performed. At this time, the wire 2A of the hydraulic winch 2 extends from the hydraulic winch 2 to the movable pulley unit 4 and is inserted through the trench of the movable pulley, and thereafter extends again toward the body frame 3, and the leading end thereof is fixed to the wire fixing unit 3E.

After having retreated to the location where the towing operation is performed, the working machine 20 lowers the towing attachment 1 to the location. With this operation, the working machine 20 is in the state illustrated in FIG. 1. When the towing attachment 1 is lowered onto the ground, the legs 3C are pushed into the ground to some extent by its own weight. Alternatively, the base 3D of the body frame 3 may be pressed from above (for example, pressed by stepping on the base). With this operation, the towing attachment 1 is securely fixed on the ground.

Thereafter, as illustrated in FIG. 1, towing is performed by driving the hydraulic winch 2 with the hydraulic pump to rewind the wire 2A. When the towing is performed, the towing attachment 1 is pulled forward by a reaction force, but because the legs 3C are dug into the ground and the connecting unit 3B is connected to the working machine 20, it is possible to resist this pulling force.

Figure 5:
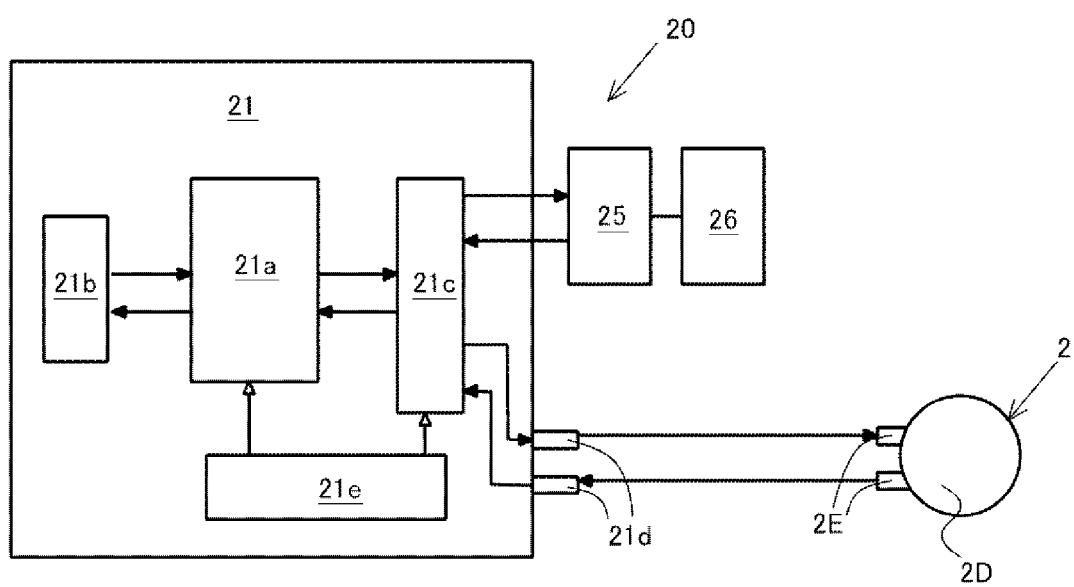
FIG. 5 is a configuration diagram very schematically illustrating a hydraulic drive circuit according to the present invention.

FIG. 5 is a configuration diagram very schematically illustrating an example of a hydraulic drive circuit according to the present invention. White arrows indicate flows of control and black arrows indicate flows of hydraulic oil. The hydraulic drive mechanism 21 of the working machine 20 includes a hydraulic pump 21a (including a drive engine), an oil tank 21b, a switching valve 21c, a hydraulic-oil external port 21d, and a control unit 21e. The hydraulic pump 21a is driven by control of the control unit 21e and delivers hydraulic oil supplied from the oil tank 21b to the switching valve 21c. The switching valve 21c switches the destination to deliver the hydraulic oil to either the attachment support unit 25 or the hydraulic-oil external port 21d by control of the control unit 21e. The hydraulic-oil external port 21d is connected to the hydraulic oil port 2E of the hydraulic winch 2 via the hydraulic hose. The hydraulic oil delivered to the hydraulic-oil external port 21d drives the hydraulic motor 2D of the hydraulic winch 2 to rotate. With this configuration, the wire of the hydraulic winch 2 is wound up.

In the present invention, it is preferable to use the hydraulic drive mechanism of the working machine in driving the hydraulic winch of the towing attachment. Accordingly, actuating and stopping of the hydraulic winch and the magnitude of the towing force by the hydraulic winch can be controlled by controlling the hydraulic drive mechanism of the working machine. This configuration is much more efficient and safer at the same time as compared to a conventional towing operation using a towing vehicle. In the towing operation using the towing vehicle, because the operator who operates the towing vehicle cannot recognize the towing state behind the vehicle, it has been difficult to perform fine control and make a quick response.

In contrast, with the present invention, the operator on the driver seat of the working machine can control the hydraulic drive mechanism to finely control the towing operation, can also visually recognize the towing state ahead, and thus can make a quick response. As another example, a hydraulic drive device other than the hydraulic drive mechanism of the working machine may be used to drive the hydraulic winch.

Figure 6:
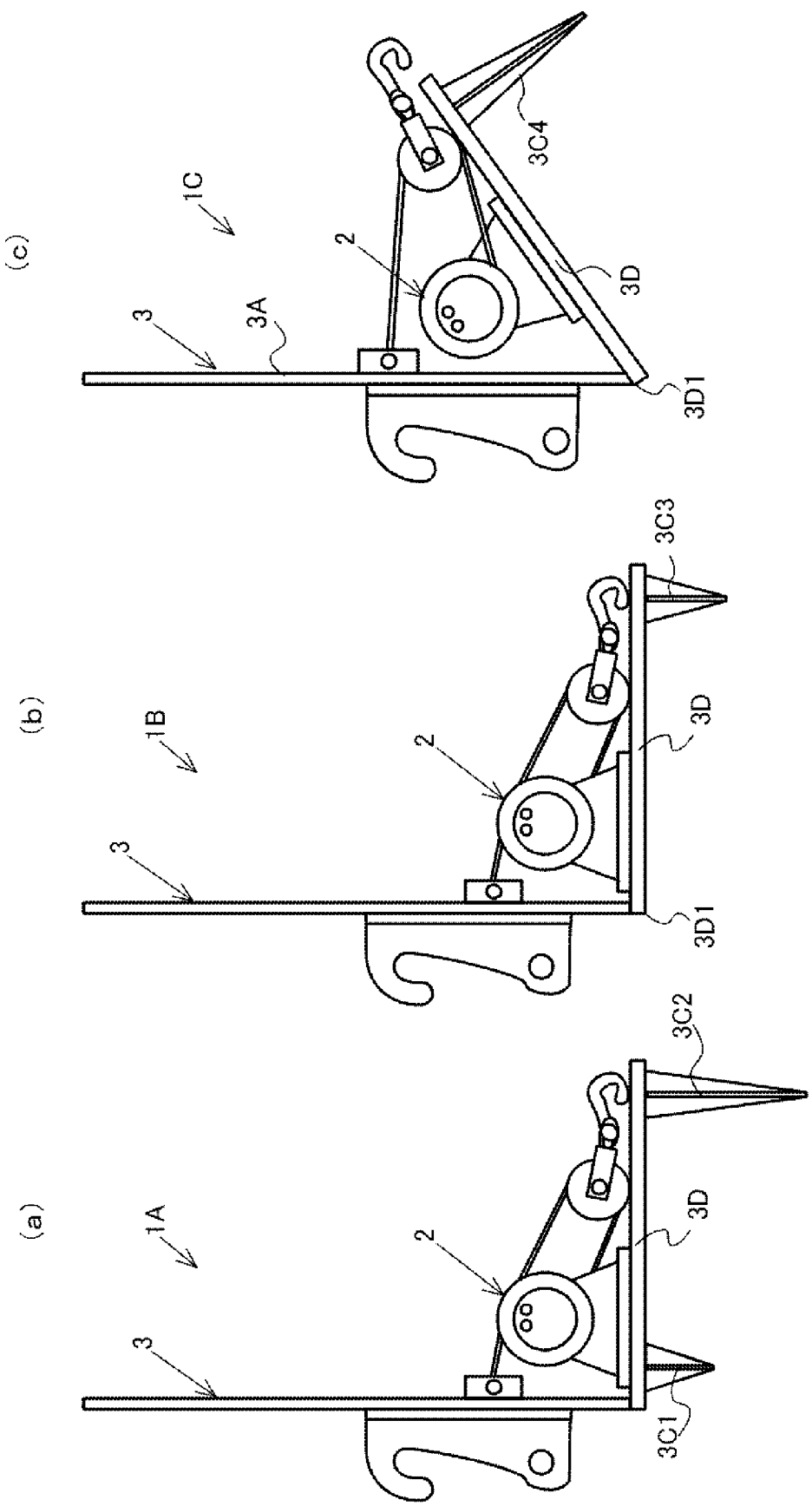
FIGS. 6(*a*), (*b*), and (*c*) are side views schematically illustrating another example of the towing attachment according to the present invention.

FIG. 6 are side views schematically illustrating another example of the towing attachment according to the present invention.

A towing attachment 1A illustrated in FIG. 6(a) is different from the towing attachment 1 illustrated in FIGS. 2 and 3 in the configuration of the legs. The towing attachment 1A has two legs 3C1 provided near the rear end of the base 3D and two legs 3C2 provided near the front end, where the legs 3C2 being longer than the legs 3C1. In the illustrated example, the legs 3C2 are approximately twice as long as the legs 3C1. This configuration is to make the fixation of the towing attachment 1A to the ground during towing more securely. Configurations of other parts of the towing attachment 1A are identical to those of the towing attachment 1 illustrated in FIGS. 2 and 3.

The towing attachment 1B illustrated in FIG. 6(b) is different from the towing attachment 1 illustrated in FIGS. 2 and 3 in the configuration of the legs. The towing attachment 1B only has two legs 3C3 provided near the front end of the base 3D, and has no legs near the rear end. In this case, a rear edge 3D1 of the base 3D functions as a support leg on the rear end.

A towing attachment 1C illustrated in FIG. 6(c) is different from the towing attachment 1 illustrated in FIGS. 2 and 3 in the shape of the body frame 3 and the configuration of the legs. The towing attachment 1C has an angle formed by the base 3D and the wall 3A in side view acute, not perpendicular.

Further, similarly to the towing attachment 1B in FIG. 6(b), the towing attachment 1C has only two legs 3C4 provided near the front end. Also in this case, the rear edge 3D1 of the base 3D functions as a support leg at the rear end. As the rear edge 3D1 is the apex of the acute angle in side view, the angle makes it easier to dig into the ground.

A mode in which characteristics of each examples illustrated in FIGS. 6(a), (b), and (c) are combined is also included in the present invention.

Figure 7:
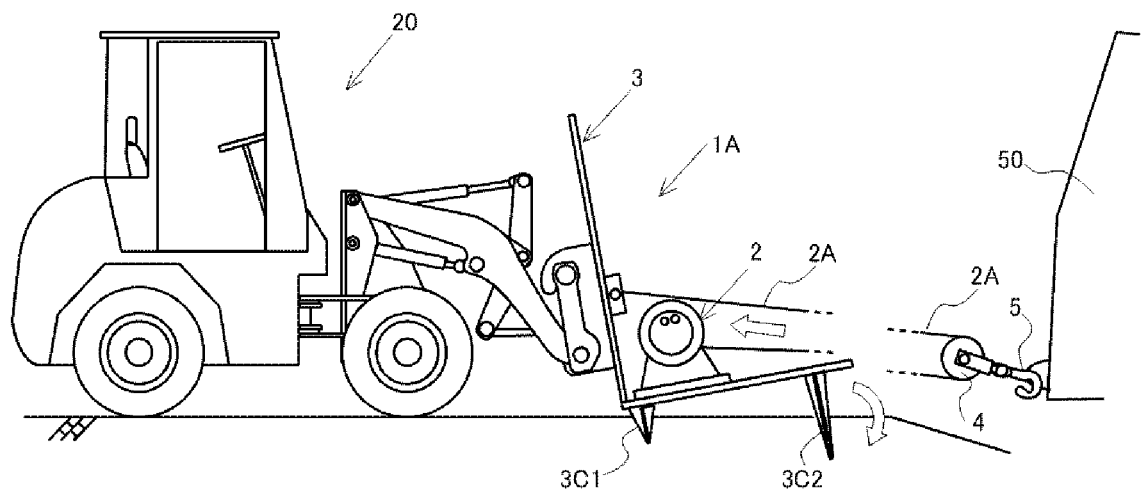
FIG. 7 is a diagram illustrating a towing process of the towing attachment illustrated in FIG. 6(*a*).

FIG. 7 is a diagram illustrating a towing process of the towing attachment 1A illustrated in FIG. 6(a). When the working machine 20 lowers the towing attachment 1A to an appropriate location, the legs 3C1 and 3C2 dig into the ground to some extent at least by the own weight thereof.

Alternatively, the base may be pressed down from above. For example, almost the entire length of the shorter legs 3C1 digs into the ground, while about half of the entire length of the longer legs 3C2 digs into the ground. Therefore, towing is performed in a state that the body frame is inclined.

Thereafter, the hook 5 attached to the movable pulley unit 4 is connected to the towing-target object 50 and the hydraulic winch 2 is driven to perform towing. With this process, tension is exerted on the wire 2A, and also a force is applied to cause the base of the body frame to rotate downward with the legs 3C1 as the fulcrum (see the arrow in FIG. 7). As a result, the longer legs 3C2 dig further into the ground, and the body frame is more securely fixed. When towing is performed, a reaction force pulls the towing attachment 1A forward, but it is possible to effectively resist this pulling force.

Regarding the towing attachments 1B and 1C illustrated in FIGS. 6(b) and (c), the rear edge 3D1 of the base 3D functions similarly to the shorter legs 3C1 of the towing attachment 1A.

Figure 8:
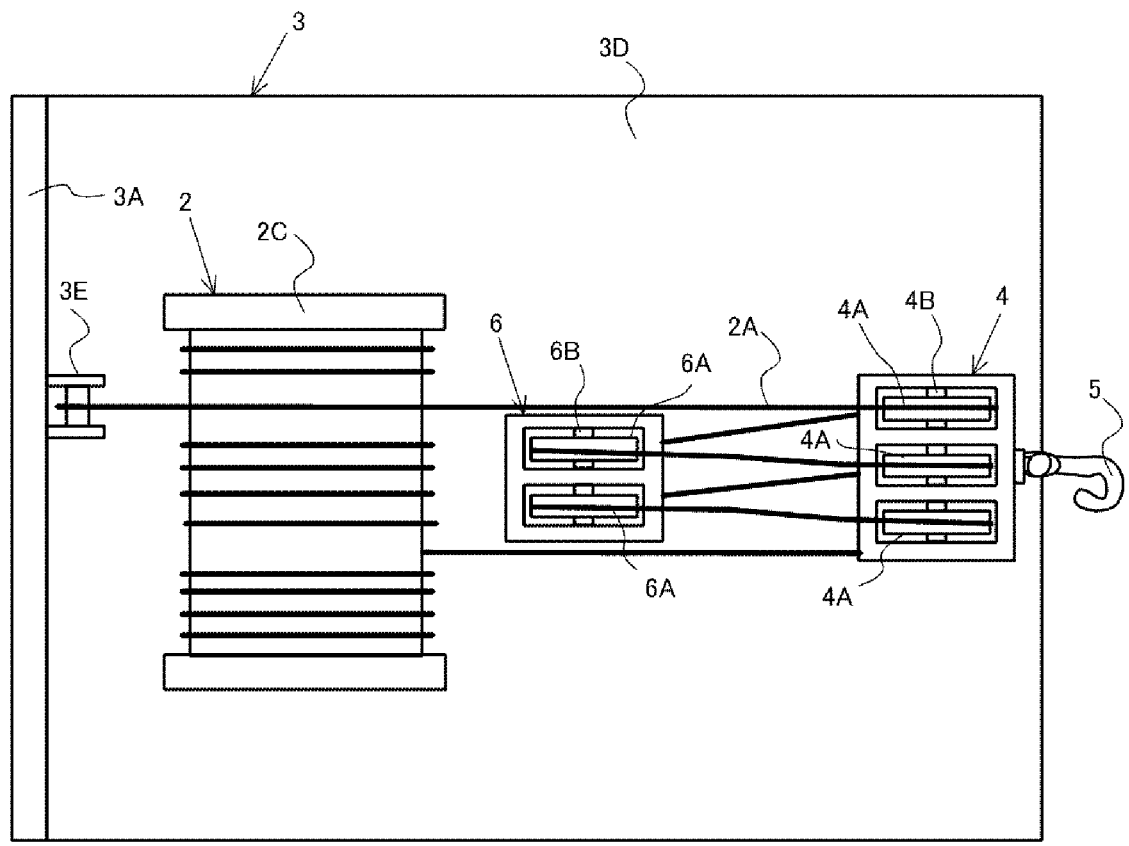
FIG. 8 is a plan view schematically illustrating still another example of the towing attachment according to the present invention.

FIG. 8 is a plan view schematically illustrating a part of still another example of the towing attachment of the present invention. The towing attachment illustrated in FIG. 8 includes the movable pulley unit 4 that is configured by combining a plurality of movable pulleys 4A provided on the common shaft 4B. Further, a fixed pulley unit 6 fixed on the body frame 3 is provided. In the illustrated example, the fixed pulley unit 6 is fixed on the upper surface of the base 3D. The fixed pulley unit 6 is also configured by combining one or plural fixed pulleys 6A provided on a common shaft 6B.

The wire 2A rolled out from the drum 2C of the hydraulic winch 2 is stretched in a reciprocated manner sequentially between each of the movable pulleys 4A in the movable pulley unit 4 and each of the fixed pulleys 6A in the fixed pulley unit 6. The leading end of the wire 2A is then fixed to the wire fixing unit 3E that is fixed on the body frame 3.

At least two movable pulleys 4A of the movable pulley unit 4 are provided, and at least one fixed pulley 6A of the fixed pulley unit 6 is provided. The number of the fixed pulleys 6A is provided as much as necessary according to the number of the movable pulleys 4A.

When tension is exerted on the wire 2A by operating the hydraulic winch 2, the pulling force of the hook 5 is amplified in proportion to the number of the movable pulleys 4A. By using a combination of the plurality of movable pulleys 4A and the plurality of fixed pulleys 6A, a towing-target object can be pulled with a force several times greater than the rated pulling force of the hydraulic winch 2. With this configuration, it becomes possible to perform the towing operation using the hydraulic winch 2 that is relatively small for the weight of the towing-target object.

Figure 9:
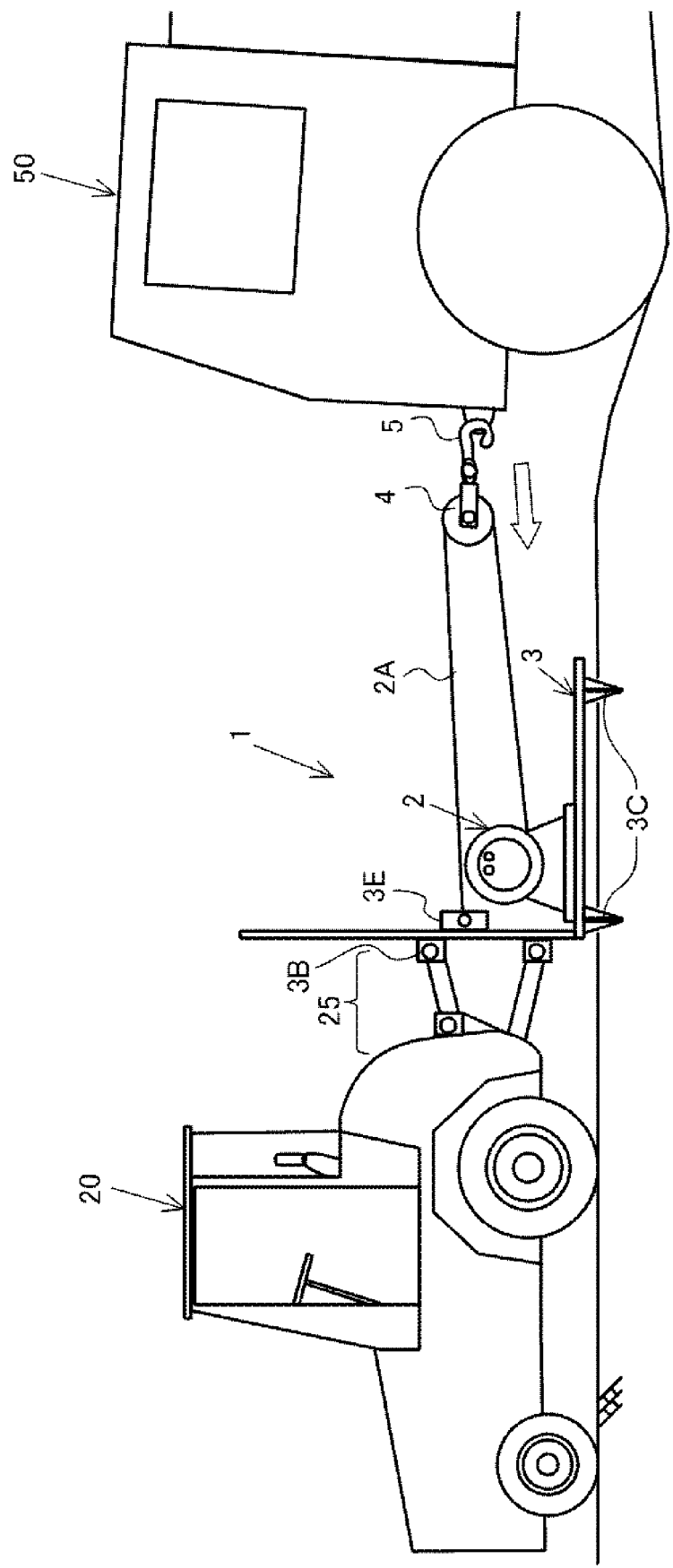
FIG. 9 is a side view schematically illustrating another example of the towing operation using the towing attachment attachable to a working machine according to the present invention.

FIG. 9 is a side view schematically illustrating another example of the towing operation using the towing attachment attachable to the working machine according to the present invention.

In the example illustrated in FIG. 9, the towing attachment 1 according to the present invention is attached to a back side of the working machine 20, which is an agricultural tractor here. The towing attachment 1 according to the present invention can be attached also to a working machine to which a work attachment is attached to a back side of the body similarly to the agricultural tractor. On a rear part of the agricultural tractor, for example, the attachment support unit 25 including a three-point link and a lift rod that is hydraulically driven, and the like is provided for attaching the work attachment.

Meanwhile, on the body frame 3 of the towing attachment 1, the connecting unit 3B attachable to the attachment support unit 25 is provided. The towing attachment 1 attached to the attachment support unit 25 can be lifted and lowered at least in a vertical direction by driving the attachment support unit 25.

The towing operation in the case of attaching the towing attachment 1 to the agricultural tractor can be performed similarly to the towing operation in the case of attaching the towing attachment 1 to the wheel loader illustrated in FIG. 4, with only difference in that the forward and backward of traveling of the working machine 20 is reversed.

As long as it follows the principle of the present invention described above, variously modified modes can be made in the invention.

REFERENCE SIGNS LIST 1, 1A, 1B, 1C towing attachment
2 hydraulic winch
2A wire
2C drum
2D hydraulic motor
2E hydraulic oil port
2F attachment frame
3 body frame
3A wall
3B connecting unit
3B1 hook portion
3B2 hinge pin hole
3C leg
3D base
3E wire fixing unit
4 movable pulley unit
5 hook
6 fixed pulley unit
20 working machine (wheel loader, agricultural tractor)
21 hydraulic drive mechanism
21a hydraulic pump
21b oil tank
21c switching valve
21d hydraulic-oil external port 21e control unit
25 attachment support unit
26 bucket
50 towing-target object

The invention claimed is:

1. A towing attachment attachable as an attachment to a working machine in order to perform towing of a towing-target object, the towing attachment comprising:
   a body frame;
   a winch fixed on the body frame;
   a connecting unit provided on the body frame so as to be attached to the working machine;
   a movable pulley unit provided with a hook for connecting to a towing-target object and at least one movable pulley; and
   a wire fixing unit provided on the body frame so as to fix a leading end of a wire that is pulled out from the winch, wherein
   the wire is wound on the movable pulley in the movable pulley unit between the winch and the wire fixing unit, and
   the body frame includes a base having an upper surface to which the winch is fixed, and a wall that rises from the base and has the connecting unit provided thereon.

2. The towing attachment attachable to a working machine according to claim 1, further comprising a fixed pulley unit that is configured by combining one or plural fixed pulleys provided on a common shaft and is fixed on the body frame, wherein the movable pulley unit is configured by combining a plurality of movable pulleys provided on a common shaft, and
   the wire is stretched in a reciprocated manner between the winch and the wire fixing unit and between each of movable pulleys in the movable pulley unit and each of fixed pulleys in the fixed pulley unit.

3. The towing attachment attachable to a working machine according to claim 1, wherein the wall has a look-through portion in which a plurality of perforations are formed in order to secure a field of view from a back side of the wall to a front side thereof.

4. The towing attachment attachable to a working machine according to claim 1, wherein an angle formed by the base and the wall in side view is perpendicular.

5. The towing attachment attachable to a working machine according to claim 1, wherein an angle formed by the base and the wall in side view is an acute angle.

6. The towing attachment attachable to a working machine according to claim 1, further comprising a plurality of legs projecting from a lower surface of the base, wherein the plurality of legs are provided near both a front end and a rear end of the base or provided only near the front end of the base.

7. The towing attachment attachable to a working machine according to claim 6, wherein when the plurality of legs are provided near both the front end and the rear end of the base, a leg provided near the front end is longer than a leg provided near the rear end.

8. The towing attachment attachable to a working machine according to claim 1, wherein the winch is a hydraulic winch.

9. The towing attachment attachable to a working machine according to claim 2, wherein the wall has a look-through portion in which a plurality of perforations are formed in order to secure a field of view from a back side of the wall to a front side thereof.

10. The towing attachment attachable to a working machine according to claim 2, wherein an angle formed by the base and the wall in side view is perpendicular.

11. The towing attachment attachable to a working machine according to claim 2, wherein an angle formed by the base and the wall in side view is an acute angle.

12. The towing attachment attachable to a working machine according to claim 2, further comprising a plurality of legs projecting from a lower surface of the base, wherein the plurality of legs are provided near both a front end and a rear end of the base or provided only near the front end of the base.

13. The towing attachment attachable to a working machine according to claim 3, further comprising a plurality of legs projecting from a lower surface of the base, wherein the plurality of legs are provided near both a front end and a rear end of the base or provided only near the front end of the base.

14. The towing attachment attachable to a working machine according to claim 4, further comprising a plurality of legs projecting from a lower surface of the base, wherein the plurality of legs are provided near both a front end and a rear end of the base or provided only near the front end of the base.

15. The towing attachment attachable to a working machine according to claim 5, further comprising a plurality of legs projecting from a lower surface of the base, wherein the plurality of legs are provided near both a front end and a rear end of the base or provided only near the front end of the base.

* * * * *